US007403485B2

(12) United States Patent
Rosenberg

(10) Patent No.: US 7,403,485 B2
(45) Date of Patent: Jul. 22, 2008

(54) OPTIMUM CONSTRUCTION OF A PRIVATE NETWORK-TO-NETWORK INTERFACE

(75) Inventor: Eric Rosenberg, Lincroft, NJ (US)

(73) Assignee: AT&T Corp., New York, NY (US)

( * ) Notice: Subject to any disclaimer, the term of this patent is extended or adjusted under 35 U.S.C. 154(b) by 709 days.

(21) Appl. No.: 10/919,210

(22) Filed: Aug. 16, 2004

(65) Prior Publication Data

US 2006/0034289 A1    Feb. 16, 2006

(51) Int. Cl.
*G01R 31/08* (2006.01)
*G06F 11/00* (2006.01)
(52) U.S. Cl. ................ 370/238.1; 370/395.2; 370/408; 709/222
(58) Field of Classification Search ................ 370/238, 370/238.1, 395.1, 395.2, 408; 709/222
See application file for complete search history.

(56) References Cited

U.S. PATENT DOCUMENTS

| | | | | |
|---|---|---|---|---|
| 6,115,753 A * | 9/2000 | Joens | ......................... | 709/242 |
| 6,147,971 A * | 11/2000 | Rochberger et al. | ......... | 370/238 |
| 6,304,549 B1 * | 10/2001 | Srinivasan et al. | .......... | 370/230 |
| 6,606,303 B1 * | 8/2003 | Hassel et al. | ................ | 370/238 |
| 6,614,762 B1 * | 9/2003 | Illiadis et al. | ............... | 370/252 |
| 6,724,881 B1 * | 4/2004 | McAllister et al. | ..... | 379/220.01 |
| 6,744,734 B1 * | 6/2004 | Iliadis et al. | ............ | 370/238.1 |
| 7,010,471 B2 * | 3/2006 | Rosenberg | ...................... | 703/2 |
| 7,120,119 B2 * | 10/2006 | Frelechoux et al. | ......... | 370/238 |
| 7,307,956 B2 * | 12/2007 | Kaplan et al. | ............... | 370/238 |
| 2001/0015958 A1 * | 8/2001 | Iliadis et al. | ................ | 370/238 |

OTHER PUBLICATIONS

Illiadis, "Optimal PNNI complex node representations for restrictive costs and minimal path computation time", Aug. 2000, IEEE/ACM Transactions on Networking, vol. 8, p. 493-506.*
Iliadis et al, "PNNI clustering under node mobility in ATM networks", Nov. 12, 1998, IEEE Globecom 1998, vol. 1, p. 613-620.*

\* cited by examiner

*Primary Examiner*—Hassan Kizou
*Assistant Examiner*—Brian T O'Connor
(74) *Attorney, Agent, or Firm*—Peter V. D. Wilde

(57) ABSTRACT

The number of nodes in a private network-to-network interface may be very large. These nodes can be organized in two or more hierarchical levels.

Network performance parameters, for example, call set-up time, may be used to determine the optimum number of hierarchical levels for a given PNNI network. A multi-step algorithm is presented for calculating the optimum number of levels in the network for a given number of nodes.

1 Claim, 2 Drawing Sheets

OPTIMUM CONSTRUCTION OF A PRIVATE NETWORK-TO-NETWORK INTERFACE

FIELD OF THE INVENTION

This invention relates to private network-to-network interfaces (PNNI), and more specifically to methods for constructing PNNI networks with optimized architecture.

BACKGROUND OF THE INVENTION

Private network-to-network interfaces (PNNI) refers to very large ATM networks that communicate between multiple private networks. Depending on the number of nodes served by the PNNI network, the architecture may be flat (non-hierarchical) or may have two or more hierarchical levels. When the network topology moves to multiple level architecture, several new effects on network performance are introduced. A primary motive for introducing new levels in a PNNI network is to increase routing efficiency and reduce call set-up time. However, added levels increase cost and management complexity. Thus there is an important trade-off when considering adding new hierarchical levels.

A typical PNNI network is organized in peer groups. These are subunits of the total network that are interconnected as a group, with each group then interconnected in the PNNI network. An advantage of this architecture is that communications between members in a peer group can be independent of overall network management. When a communication between a node in one peer group and a node in another peer group is initiated, the PNNI protocol is used for that call set-up and management. The size of the peer groups, i.e. the number of nodes in each peer group, also affects the overall performance of the PNNI network. Methods for optimizing peer group size are described and claimed in my co-pending application Ser. No. 10/918,913, filed Aug. 16, 2004.

To make an accurate evaluation of the trade-off described above requires that the changes in call set-up times when a new hierarchical level is added be known with a high confidence level.

BRIEF STATEMENT OF THE INVENTION

According to the invention, a technique has been developed that evaluates important network performance parameters, for example, call set-up time, for different network topologies. These are used to determine the optimum number of hierarchical levels for a given PNNI network.

BRIEF DESCRIPTION OF THE DRAWING

The invention may be better understood when considered in conjunction with the drawing in which.

DETAILED DESCRIPTION OF THE INVENTION

Figure 1:
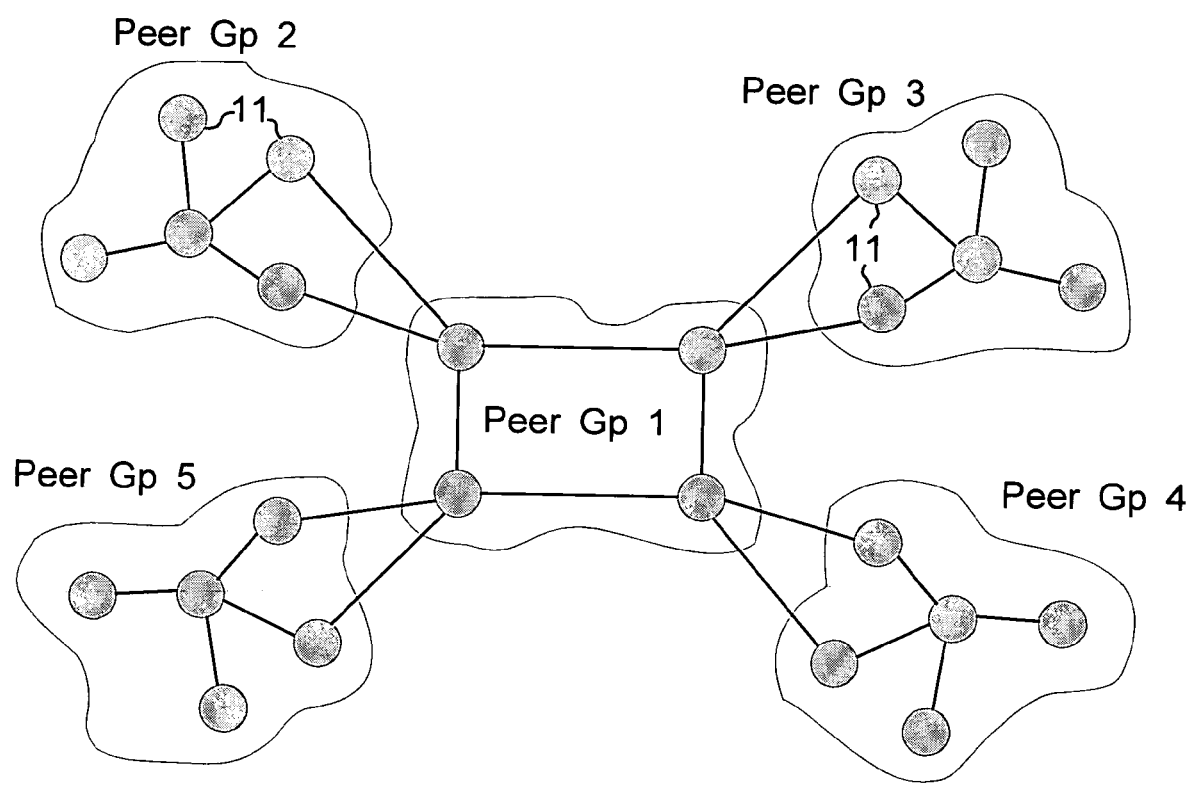
FIG. 1 is a schematic diagram of a flat (non-hierarchical) PNNI network.
Figure 2:
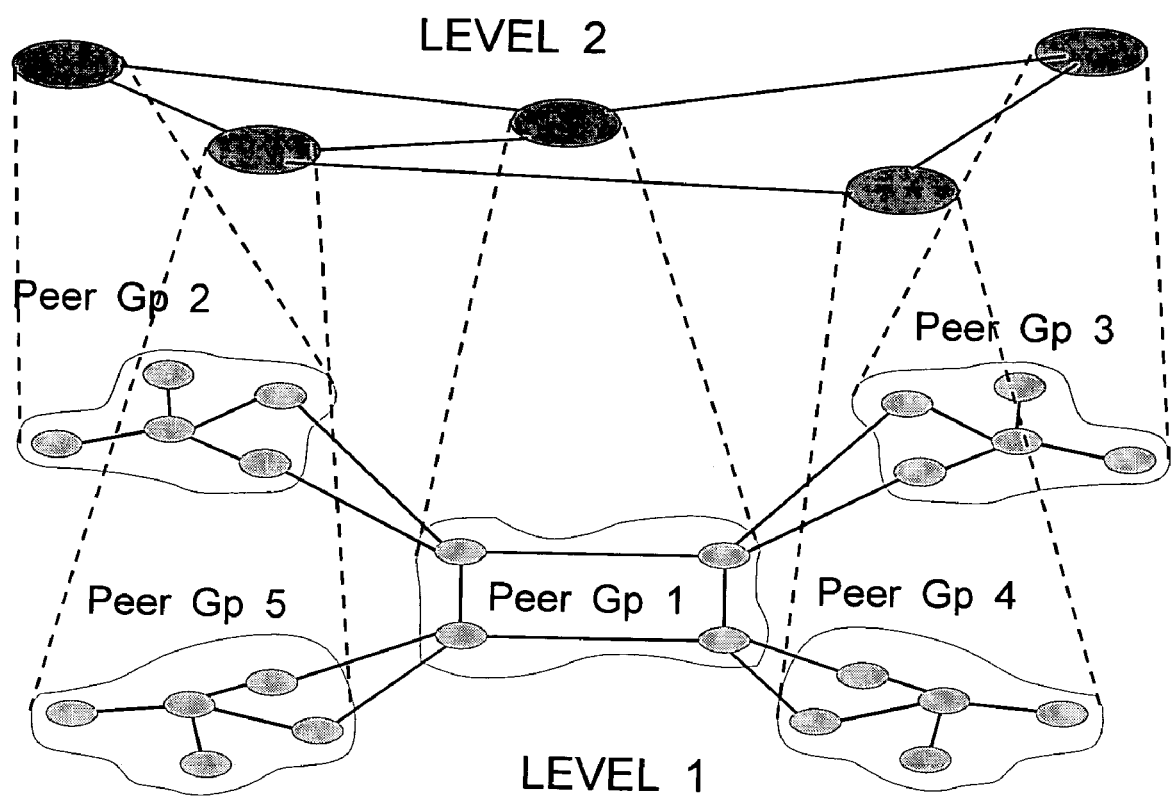
FIG. 2 is a schematic representation of a two-level hierarchical PNNI network.

With reference to FIG. 1, a flat topological PNNI network is represented.

In the discussion that follows, let N be the total number of lowest-level nodes (i.e., the number of ATM switches). Let $x_1$ be the number of lowest-level nodes in each level-1 PG, and let $x_2 = N/x_1$ be the number of level-1 PGs (all variables are assumed to be continuous).

Define $A = \{\alpha | \alpha > 1\}$. We assume the time complexity of computing a minimum cost path in a flat (non-hierarchical) network with z nodes is $R_1(z) = \alpha_0 z^\alpha$, where $\alpha_0 > 0$ and $\alpha \in A$. For example, for Dijkstra's shortest path method we have $\alpha = 2$.

Certain nodes are identified as border nodes. A level-1 border node of a PG is a lowest-level node which is an endpoint of a trunk linking the PG to another level-1 PG. For example, if each U.S. state is a level-1 PG, and if there is a trunk from switch a in Chicago to switch b in Denver, then a and b are level-1 border nodes. Define $\Gamma = \{\gamma | 0 \leq \gamma < 1\}$. We assume the number of level-1 border nodes in a PG with $x_1$ lowest-level nodes is bounded above by $B_1(x_1) = \gamma_0 x_1^\gamma$, where $\gamma_0 > 0$ and $\gamma \in \Gamma$. The case where each PG has a constant number of border nodes is modelled by choosing $\gamma_0 = k$ and $\gamma = 0$. The case where the border nodes are the (approximately $4\sqrt{x_1}$) boundary nodes of a square grid of $x_1$ switches is modelled by choosing $\gamma_0 = 4$ and $\gamma = \frac{1}{2}$.

Define $K = \{\kappa | 0 \leq \kappa \leq 1\}$. We assume the total number of level-1 PGs, excluding the source level-1 PG, that the connection visits is bounded above by $V_1(x_2) = \kappa_0(x_2^\kappa - 1)$, where $\kappa_0 > 0$ and $\kappa \in K$. Note that $V_1(1) = 0$, which means that in the degenerate case of exactly one level-1 PG, there are no PGs visited other than the source PG.

This functional form for $V_1(x_2)$ is chosen since the expected distance between two randomly chosen points in a square with side length L is kL, where k depends on the probability model used: using rectilinear distance, with points uniformly distributed over the square, we have $k = \frac{2}{3}$; using Euclidean distance we have $k = (\frac{1}{15})[2 + \sqrt{2} + 5 \log(\sqrt{2} + 1)] \approx 0.521$; with an isotropic probability model we have $k = [(2\sqrt{2}/(3\pi)] \log(1 + \sqrt{2}) \approx 0.264$. If the $x_2$ PGs are arranged in a square grid, a random connection will visit approximately $k\sqrt{x_2}$ PGs. Choosing $\kappa_0 = k$ and $\kappa = \frac{1}{2}$, the total number of PGs visited is approximately $\kappa_0 x_2^\kappa$. Choosing $\kappa_0 = 1$ and $\kappa = 1$ models the worst case in which the path visits each level-1 PG.

The source node of a connection in a two-level network sees the $x_1$ nodes in the source PG, and at most $B_1(x_1)$ border nodes in each of the $x_2 - 1$ non-source PGs. A path computation is performed by the entry border node of at most $V_1(x_2)$ non-source PGs. In each non-source PG visited, the entry border node sees only the $x_1$ nodes in its PG when computing a path across the PG (or a path to the destination node, in the case of the destination PG), and so the path computation time complexity at each entry border node is $R_1(x_1)$. Hence the total path computation time is bounded above by $R_1(x_1 + (x_2 - 1)B_1(x_1)) + V_1(x_2)R_1(x_1) = \alpha_0[x_1 + (x_2 - 1)\gamma_0 x_1^\gamma]^\alpha + \kappa_0(x_2^\kappa - 1)\alpha_0 x_1^\alpha$. We ignore the constant factor $\alpha_0$. The optimization problem for a 2-level hierarchy is thus: minimize $[x_1 + (x_2 - 1)\gamma_0 x_1^\gamma]^\alpha + \kappa_0 x_1^\alpha(x_2^\kappa - 1)$ subject to $x_1 x_2 = N$.

We next transform this optimization problem to a convex optimization problem (which has a convex objection function, a convex feasible region, and any local minimum is also a global minimum. We approximate $x_2 - 1$ by $x_2$ and $x_2^\kappa - 1$ by $x_2^\kappa$, yielding the objective function $[x_1 + \gamma_0 x_1^\gamma x_2]^\alpha + \kappa_0 x_1^\alpha x_2^\kappa$, which also upper bounds the total path computation time. We rewrite the constraint $x_1 x_2 = N$ as $N x_1^{-1} x_2^{-1} = 1$, which can be replaced by $N x_1^{-1} x_2^{-1} \leq 1$, since the inequality must be satisfied as an equality at any solution of the optimization problem. Letting $y = x_1 + \gamma_0 x_1^\gamma x_2$ yields the optimization problem: minimize $y^\alpha + \kappa_0 x_1^\alpha x_2^\kappa$ subject to $x_1 + \gamma_0 x_1^\gamma x_2 \leq y$ and $N x_1^{-1} x_2^{-1} \leq 1$. The inequality constraint $x_1 + \gamma_0 x_1^\gamma x_2 \leq y$ must be satisfied as an equality in any solution; we rewrite this constraint as $x_1 y^{-1} + \gamma_0 x_1^\gamma x_2 y^{-1} \leq 1$. Let $s_1 = \log x_1$, $s_2 = \log x_2$, $s=(s_1, s_2)$, and $t=\log y$. Combining exponential terms, we obtain the optimization problem $T_2(N)$:

$$\text{minimize } f_2(s,t) = e^{\alpha t} + \kappa_0 e^{(\alpha s_1 + \kappa s_2)} \quad (1)$$

$$\text{subject to } e^{(s_1-t)} + \gamma_0 e^{(\gamma s_1 + s_2 - t)} \leq 1; \quad (2)$$

$$Ne^{(-s_1-s_2)} \leq 1. \quad (3)$$

Problem $T_2(N)$ it is a special type of convex optimization problem called a geometric program. Geometric programs are particularly well suited to engineering design, with a rich duality theory permitting particularly efficient solution methods.

Let $f_2^*(N)$ be the infimum of the primal objective function (1) subject to the primal constraints (2) and (3). Thus $f_2^*(N)$ is the minimum total path computation time for a two-level PNNI network with N lowest-level nodes.

Define $$\omega = \alpha\gamma + \frac{\alpha^2(1-\gamma)^2}{\alpha(2-\gamma)-\kappa} \text{ and} \quad (4)$$

$$\omega_0 = \alpha^\alpha e^{(2+\kappa_0+\gamma_0)/e}, \quad (5)$$

Theorem 1 below states that $\omega_0 N^\omega$ is an upper bound on the minimum total path computation time for two-level PNNI networks.

Theorem 1. For all $N>0$ we have $f_2^*(N) \leq \omega_0 N^\omega$.

By assumption, the computational complexity of routing in a flat network with N nodes has complexity $\alpha_0 z^\alpha$. That is, flat network routing has computational complexity $O(N^\alpha)$. (Recall that a function $g(z)$ of the single variable z is $O(x^n)$ if $g(z) \leq \eta_0 z^n$ for some $\eta_0 > 0$ and all sufficiently large z.) Theorem 1 above states that the computational complexity of routing in a two-level network with N nodes is $O(N^\omega)$.

Theorem 2. $\omega < \alpha$.

Theorem 2 implies that, for all sufficiently large N, the computational complexity of path computation is smaller for a two-level network that for a flat network. By evaluating $\omega$, the advantage of using a two-level network, rather than a flat network, can be computed. The larger the difference $\alpha - \omega$, the larger the computational savings of using a two-level network. With $\alpha = 2$ and $\kappa = \gamma = \frac{1}{2}$, we have $\omega = 7/5$, so the minimum total path computation time is $O(N^{7/5})$, rather than the flat network value $O(N^2)$. With $\alpha = 2$, $\kappa = \frac{1}{2}$ and $\gamma = 0$, we have $\omega = 8/7$, so having a constant number of border nodes for each PG reduces the total routing time to $O(N^{8/7})$.

For a three-level network, let N be the total number of lowest-level nodes, let $x_1$ be the number of lowest-level nodes in each level-1. PC, $x_2$ be the number of level-1. PCs in each level-2 PG, and $x_3$ be the number of level-2 PGs. Thus $x_1 x_2 x_3 = N$.

As for H=2, we assume the complexity of routing in a flat network with z lowest-level nodes is $R_1(z) = \alpha_0 z^\alpha$, where $\alpha_0 > 0$ and $\alpha \in A$.

As for H=2, certain nodes are identified as border nodes. A level-1 border node of a PG in a 3-level network is a lowest-level node which is an endpoint of a trunk linking the PG to another level-1 PG within the same level-2 PG. A level-2 border node of a PG in a 3-level network is a lowest-level node which is an endpoint of a trunk linking the PG to another level-2 PG within the same PNNI network. For example, suppose each country in the world is a level-2 PG, and each U.S. state is a level-1 PG. Then if there is a trunk from a switch a in Boston to a switch b in London, a and b are level-2 border nodes.

For h=1, 2, we assume that the number of level-h border nodes in a level-h PG with z lowest-level nodes is bounded above by $B_h(z) = \gamma_0 z^\gamma$, where $\gamma_0 > 0$ and $\gamma \in \Gamma$. Thus each level-1 PG has at most $B_1(x_1) = \gamma_0 x_1^\gamma$ level-1 border nodes, and each level-2 PG has at most $B_2(x_1 x_2) = \gamma_0 (x_1 x_2)^\gamma$ level-2 border nodes.

We assume that the total number of level-2 PGs, excluding the source level-2 PG, that the connection visits is bounded above by $V_2(x_3) = \kappa_0(x_3^\kappa - 1)$, where $\kappa_0 > 0$ and $\kappa \in K$. Note that $V_2(1) = 0$, which means that in the degenerate case where there is one level-2 PG, there are no level-2 PGs visited other than the source level-2 PG. We assume that the total number of level-1 PGs visited within the source level-2 PG, excluding the source level-1 PG, is bounded above by $V_1(x_2) = \kappa_0(x_2^\kappa - 1)$.

In a three-level PNNI network, the source node sees the $x_1$ nodes in its level-1 PG, at most $B_1(x_1)$ level-1 border nodes in each of the $x_2 - 1$ level-1 PGs (excluding the source level-1 PG) in the same level-2 PG as the source, and at most $B_2(x_1 x_2)$ level-2 border nodes in each of the $x_3 - 1$ level-2 PGs (excluding the source level-2 PG) in the PNNI network. Thus the total number of nodes seen by the source is bounded above by $$x_1 + (x_2-1)B_1(x_1) + (x_3-1)B_2(x_1 x_2) = x_1 + (x_2-1)\gamma_0 x_1^\gamma + (x_3-1)\gamma_0(x_1 x_2)^\gamma.$$

The time complexity of the source path computation is bounded above by $$R_1(x_1 + (x_2-1)B_1(x_1) + (x_3-1)B_2(x_1 x_2)).$$

The total path computation time for all the level-1 PGs in the source level-2 PG, excluding the source level-1 PG, is at most $V_1(x_2)R_1(x_1)$. For $z>0$, define $R_2(z) = \omega_0 z^\omega$. The total path computation time for each of the $V_2(x_3)$ level-2 PGs visited (other than the source level-2 PG) is, by definition, $f_2^*(x_1 x_2)$, which by Theorem 2 is bounded above by $R_2(x_1 x_2)$.

To minimize the upper bound on the total path computation time for a three-level network, we solve the optimization problem:

$$\text{minimize } R_1(x_1 + (x_2-1)B_1(x_1) + (x_3-1)B_2(x_1 x_2)) + V_1(x_2)$$
$$R_1(x_1) + V_2(x_3)R_2(x_1 x_2)$$

subject to $x_1 x_2 x_3 = N$. We approximate $x_2 - 1$ by $x_2$, $x_3 - 1$ by $x_3$, $x_2^\kappa - 1$ by $x_2^\kappa$, and $x_3^\kappa - 1$ by $x_3^\kappa$, which preserves the upper bound. Introducing the variable y, we obtain the optimization problem: minimize $\alpha_0 y^\alpha + \kappa_0 x_2^\kappa \alpha_0 x_1^\alpha + \kappa_0 x_3^\kappa \omega_0 (x_1 x_2)^\omega$ subject to $x_1 + x_2 \gamma_0 x_1^\gamma + x_3 \gamma_0 (x_1 x_2)^\gamma \leq y$ and $Nx_1^{-1} x_2^{-1} x_3^{-1} \leq 1$. Letting $s_1 = \log x_1$, $s_2 = \log x_2$, $s_3 = \log x_3$, $s = (s_1, s_2, s_3)$, and $t = \log y$, we obtain the geometric program $T_3(N)$:

$$\text{minimize } f_3(s,t) = \alpha_0 e^{\alpha t} + \alpha_0 \kappa_0 e^{(\alpha s_1 + \kappa s_2)} + \kappa_0 \omega_0 e^{(\omega(s_1 + s_2) + \kappa s_3)} \quad (6)$$

$$\text{subject to } e^{s_1 - t} + \gamma_0 e^{(\gamma s_1 + s_2 - t)} + \gamma_0 e^{(\gamma(s_1 + s_2) + s_3 - t)} \leq 1 \quad (7)$$

$$Ne^{(-s_1 - s_2 - s_3)} \leq 1 \quad (8)$$

Let $f_3^*(N)$ be the infimum of the primal objective function (6) subject to constraints (7) and (8). Thus $f_3^*(N)$ is the minimum total path computation time for a three-level PNNI network with N lowest-level nodes.

Define $$\xi = \frac{\alpha(\omega - \kappa\gamma)}{\alpha(1-\gamma) + (\omega - \kappa)}. \quad (9)$$

Theorem 3. For some $\xi_0 > 0$ and all $N > 0$ we have $f_3^*(N) \leq \xi_0 N^\xi$.

By Theorem 3, the minimum total path computation time for a three-level PNNI network has computational complexity $O(N^\xi)$.

Theorem 4.

$$\omega - \xi = \frac{(\omega - \kappa)(\omega - \alpha\gamma)}{\alpha(1-\gamma) + (\omega - \kappa)} > 0.$$

Theorem 4 implies that, for all sufficiently large N, the computational complexity of path computation is smaller for a three-level PNNI network that for a two-level network. By evaluating $\omega$ and $\xi$, the advantage of using a three-level network, rather than a two-level network, can be computed. The larger the difference $\omega - \xi$, the larger the computational savings of using a three-level network. With $\alpha = 2$ and $\kappa = \gamma = \frac{1}{2}$, we have $\omega = 7/5$ and $\xi = 23/19 \approx 1.21$, so for three-level networks, the total path computation time is $O(N^{23/19})$, rather than $O(N^{7/5})$ as would be obtained with a two-level network. With $\alpha = 2$, $\kappa = \frac{1}{2}$ and $\gamma = 0$, we have $\omega = 8/7$ and $\xi = 32/37 \approx 0.865$, so the total path computation time is $O(N^{32/37})$, rather than $O(N^{8/7})$ as would be obtained with a two-level network; in this case the total path computation time is sublinear in N for a three-level network.

The following steps determine whether to design the PNNI network as a flat (non-hierarchical) network, as a two-level network, or as a three-level network.

Step 1. Compute $$\omega = \alpha\gamma + \frac{\alpha^2(1-\gamma)^2}{\alpha(2-\gamma) - \kappa}$$

Step 2. Compute $$\xi = \frac{\alpha(\omega - \kappa\gamma)}{\alpha(1-\gamma) + (\omega - \kappa)}.$$

Step 3. (a) If $\alpha - \xi \leq \tau_1$, where $\tau_1$ is a predetermined positive tolerance, then design the PNNI network as a flat (non-hierarchical) network. If $\alpha - \xi > \tau_1$, go to (b). (b) If $\omega - \xi \leq \tau_2$, where $\tau_2$ is a predetermined positive tolerance, then design the PNNI network as a two-level network. If $\omega - \xi > \tau_2$, then design the PNNI network as a three-level network.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. A method for constructing a private network-to-network interface (PNNI) network, the PNNI network configured in PNNI network peer group subunits each comprising a plurality of nodes, comprising the steps of:
    a. assembling a first level of network nodes in PNNI network peer groups by interconnecting nodes within each peer group, and interconnecting at least some of the nodes of one peer group with nodes of another peer group, so that a node in a peer group in the first level may be connected to a node in another peer group of the first level through n intermediate nodes,
    b. adding a second level of network nodes wherein the second level of network nodes are interconnected together and wherein the nodes of the second level provide interconnections between the peer groups in the first level, so that at least some of the nodes in a peer group in the first level may be connected to a node in another peer group of the first level through n−x intermediate nodes, where x is at least 1,
    wherein the step of adding the second level of network nodes is performed using the calculation:
    where, $\alpha$ represents the time complexity of computing a minimum cost path in a flat network, $\gamma$ is a constant characterizing the number of border nodes in the network, $\kappa$ characterizes the number of lower level peer groups in each higher level peer group that is visited by a network connection, $\tau$ is a predetermined positive tolerance, and $\omega$, $\xi$, are temporary variables.

* * * * *